(12) United States Patent
Kuntze-Fechner et al.

(10) Patent No.: US 8,834,128 B2
(45) Date of Patent: Sep. 16, 2014

(54) TENSION-TORQUE-TRANSMISSION ELEMENT FOR A FENESTRON BLADE AND METHOD FOR PRODUCING IT

(75) Inventors: Gerald Kuntze-Fechner, Waakirchen (DE); Martin Schulz, Hohenkirchen-Siegertsbrunn (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 1144 days.

(21) Appl. No.: 12/726,564

(22) Filed: Mar. 18, 2010

(65) Prior Publication Data
US 2010/0278648 A1 Nov. 4, 2010

(30) Foreign Application Priority Data
Apr. 29, 2009 (EP) .................................... 09400017

(51) Int. Cl.
| F01D 5/14 | (2006.01) |
| B64C 27/33 | (2006.01) |
| B29D 99/00 | (2010.01) |
| B29C 70/54 | (2006.01) |
| B64C 27/473 | (2006.01) |
| B29L 31/08 | (2006.01) |

(52) U.S. Cl.
CPC ......... B64C 27/33 (2013.01); *B64C 2027/4736* (2013.01); *B29L 2031/082* (2013.01); B29D 99/0025 (2013.01); B29C 70/545 (2013.01)
USPC .......................................... 416/230; 416/239

(58) Field of Classification Search
USPC ...... 416/204 R, 210 R, 213 A, 230, 238, 239, 416/241 A, 134 A
See application file for complete search history.

(56) References Cited

U.S. PATENT DOCUMENTS

| 4,386,989 | A | * | 6/1983 | Aubry ........................... 156/182 |
| 4,760,105 | A | * | 7/1988 | Fuller et al. .................... 523/420 |
| 5,358,381 | A | * | 10/1994 | Covington et al. ........ 416/134 A |
| 5,372,479 | A | * | 12/1994 | Byrnes et al. ............. 416/134 A |
| 5,383,767 | A |   | 1/1995 | Aubry |
| 5,431,538 | A | * | 7/1995 | Schmaling et al. ....... 416/134 A |

(Continued)

FOREIGN PATENT DOCUMENTS

| DE | 693 03 152 | 2/1997 |
| DE | 692 24 525 | 8/1998 |

(Continued)

OTHER PUBLICATIONS

French Search Report dated Nov. 10, 2009, from corresponding French application.

*Primary Examiner* — Edward Look
*Assistant Examiner* — William Grigos
(74) *Attorney, Agent, or Firm* — Brooks Kushman P.C.

(57) ABSTRACT

A tension-torque-transmission element (3; 3'; 4) for a rotor blade of a rotary wing aircraft (helicopter), in particular for a fenestron blade of a tail rotor, with a connecting section on the blade side and a connecting section (30; 30'; 40) on the axis side, with a connecting eye (32) on each connecting section, and with a torque-transmission section (34; 34'; 44) that connects the connecting sections (30; 30'; 40), is improved in that the tension-torque-transmission element (3; 3'; 4) is designed in a fiber-reinforced composite design including several layers (A to G) of a textile fabric. A method for producing such a tension-torque-transmission element (3; 3'; 4) is also described.

16 Claims, 4 Drawing Sheets

(56) References Cited

U.S. PATENT DOCUMENTS

| | | | |
|---|---|---|---|
| 5,454,693 A | | 10/1995 | Aubry et al. |
| 5,690,474 A | * | 11/1997 | Byrnes et al. ............. 416/134 A |
| 5,738,494 A | * | 4/1998 | Schmaling ................ 416/134 A |
| 5,759,325 A | * | 6/1998 | Davis ............................ 156/154 |
| 5,961,288 A | * | 10/1999 | Rene Legendre et al. 416/134 A |
| 6,000,453 A | * | 12/1999 | Davis ............................ 156/382 |
| 6,004,099 A | * | 12/1999 | Bansemir et al. ............... 416/31 |
| 2005/0089704 A1 | * | 4/2005 | Rajabali et al. ............... 428/544 |
| 2006/0193727 A1 | | 8/2006 | Denecke et al. |
| 2008/0101934 A1 | | 5/2008 | Stamps et al. |

FOREIGN PATENT DOCUMENTS

| | | |
|---|---|---|
| EP | 1 251 068 | 10/2002 |
| GB | 2 131 373 | 6/1984 |
| WO | 98/02918 | 2/1993 |

* cited by examiner

TENSION-TORQUE-TRANSMISSION ELEMENT FOR A FENESTRON BLADE AND METHOD FOR PRODUCING IT

CROSS-REFERENCE TO RELATED APPLICATIONS

This application claims priority to European Application No. EP 09 400017.1 filed Apr. 29, 2009, the disclosure of which is hereby incorporated in its entirety by reference herein.

FIELD OF THE INVENTION

The invention relates to a tension-torque-transmission element for a rotor blade of a rotary wing aircraft or helicopter. Said tension-torque-transmission element can in particular be used for a fenestron blade of the tail rotor of a helicopter. The tension-torque-transmission element comprises a connecting section on the blade side, a connecting section on the axis-side, a connecting eye on each connecting section, and a torque-transmission section or spar that interconnects the connecting sections. Furthermore, the invention relates to a method for producing such a tension-torque-transmission element in a fibre-reinforced composite design.

BACKGROUND OF THE INVENTION

In DE 692 24 525 T2 in FIG. 2 a tension-torque-transmission element is shown that is formed from a thin steel wire of a diameter of approximately 0.82 mm. The steel wire is wound several times around two bolts so that they form an elongated coil that is cast in plastic. As an alternative to this, the printed publication mentions a tension-torque-transmission element comprising composite beam material that comprises plates, arranged one on top of the other without any seals, which plates form a packet of the thickness of all the plates.

DE 693 03 152 T2 shows a somewhat more distant state of the art. The tension-torque-transmission element mentioned therein is integrated in a rotor blade and is connected to it in one piece. It is designed as a connecting loop at the end of a longitudinal carrier of the rotor blade from one strand with continuous reinforcement fibres of carbon, which fibres extend in one direction. However, this design has been shown to have an unacceptably short service life and lacks damage tolerance so that as a less practicable solution it is rarely used.

OBJECT AND SUMMARY OF THE INVENTION

It is the object of the invention to state a tension-torque-transmission element whose production, construction and installation is simpler than in known tension-torque-transmission elements.

In the tension-torque-transmission element stated in the introduction this object is met in that it is layered in a fibre-reinforced composite design comprising several layers of a textile fabric. The invention thus moves away from the teaching of the state of the art, according to which the tension-torque-transmission element is to comprise metal, in particular for reasons of load resistance. Nor does the invention pursue an integrated design of the tension-torque-transmission element in the rotor blade. Instead, the invention pursues the principle of producing the tension-torque-transmission element separately on the one hand, and in a fibre-reinforced composite design on the other hand. The tension-torque-transmission element thus has a significantly lighter weight than a comparable component of metal. Furthermore, its production-, maintenance- and installation effort are reduced when compared to that of the separate tension-torque-transmission elements described above. Nonetheless, production of the tension-torque-transmission element in a fibre-reinforced composite design promises a long service life and damage-tolerant behaviour, which is of decisive importance in the operation of a rotor. Moreover, designs in fibre-reinforced composite are economical, are easily reproducible, and involve low-risk production methods. In addition, the separate tension-torque-transmission element can with little effort at least be subjected to visual inspection both after its production and during subsequent maintenance procedures, i.e. can easily be checked.

According to the invention, the tension-torque-transmission element comprises a bundle of stratified flat fibre layers. Apart from the tensile force from the centrifugal force of the rotating rotor blade, the tension-torque-transmission element has to absorb torsional moments. It therefore to some extent has to be designed so as to be torsionally flexible. This can be achieved by dimensioning the cross section. For example, a regular rectangular cross section can be dimensioned according to height and width and according to the ratio of height to width in order to achieve corresponding torsional rigidity. As an alternative to this, other cross sections, for example cruciform cross sections, ellipses, hexagons or octagons or variants of these shapes, if need be with incisions or hollow spaces extending in the direction of centrifugal forces, for influencing torsional rigidity can be selected. Thus the tension-torque-transmission element can also, for example, comprise braces that are flat and arranged one on top of the other, or almost square braces that are arranged one beside the other, with the envelope of these braces resulting in a flat rectangular cross section. A cross section comprising several layered spar tapes that essentially extend in the direction of extension of the rotor wing and that are separate from each other has been shown to be particularly advantageous both as far as torsional rigidity and, in particular, as far as its production is concerned. Several layered spar tapes that are interconnected, together form a lamella, with several lamellae forming the tension-torque-transmission element.

According to an advantageous embodiment of the invention, the lamellae comprise spar tapes, made from unidirectional fibre material, that extend from one connecting section to the opposite other connecting section. The fibres, which extend through the entire tension-torque-transmission element, are loaded in their longitudinal direction, and are thus optimally loaded, because they extend in the direction of the centrifugal force that predominantly acts on them when the rotor is in use. As a result of this flow of the fibres, which corresponds to the load, the individual fibre layers have a higher load-bearing capacity, so that with the same load-bearing capacity fewer fibre layers are required. This results in a flat and space-saving design that moreover leads to a reduction in the weight of the tension-torque-transmission element. The design in accordance with the fibres minimises tension resulting from the load acting on the tension-torque-transmission element, thus ensuring a long service life.

According to a further advantageous embodiment of the invention, the spar tapes are different in width, depending on their height position in the tension-torque-transmission element. Those spar tapes that are arranged in a middle region of the tension-torque-transmission element are designed to be wider than those that are located on the outside, or at the top and bottom. In this way the tension-torque-transmission element obtains its characteristic cross section, which in principle is rectangular and on its narrow sides is slightly bulging or curved.

According to a further advantageous embodiment of the invention, the connecting sections of the tension-torque-transmission element each comprise a connecting eye by means of which the tension torque-transmission element can be attached, by way of a bolt that extends essentially perpendicularly to its plane of extension, on the one hand to the rotor blade and on the other hand to the drive device. Each connecting eye can thus in the simplest case be designed as a cylindrical opening in the connecting section. It penetrates the individual fibre layers also perpendicularly to their plane of extension. In operation, the connecting eye forms a hole-face connection which loads the fibre layers of the connecting section and thus also those of the tension-torque-transmission element, which is situated in between, practically exclusively in their plane of extension, with the load thus being optimal in accordance with the fibres. With force introduction by way of a bolt, no force deviation in the fibre layers occurs through the hole-face connection of the connecting eye, which force deviation could result in delamination in the connecting section. Instead, the loaded fibre layers extend entirely free of torsion between the connecting eyes. This in turn makes possible maximum loadability with minimum use of materials. This is beneficial in the context of economical production, a long service life, short external dimensions and light weight of the tension-torque-transmission element.

The tension-torque-transmission element with the two connecting eyes for introducing the force by means of the hole-face thus represents a component that is not disturbed by fibre ends or fibre butt joints, which component instead introduces the force of a bolt optimally into the other bolt by way of the hole-face. As a completely undisturbed component it has been shown to have a particularly good load-bearing capacity and can be manufactured with few faults. At an identical design height the connecting eye has a greater load-bearing capacity than an eye produced in the conventional loop design. Its ratio of margin space to diameter should be in the region of between 1.3 and 2.0 to ensure optimal strength behaviour.

Moreover, the fibre layers in which the connecting eye is made extend essentially flat, planar and without twisting that tends to lead to delamination. The invention thus teaches a design of a tension-torque-transmission element which despite the constructively favourable design of a connecting eye does not require any disadvantageous twisted fibre layers. Twisting of the fibre layers according to the state of the art requires very precise, and thus expensive and error-prone, positioning of the individual fibre layers. In contrast to this, the design of a bearing laminate is considerably simpler, less sensitive to production errors, and shorter.

According to a further advantageous embodiment of the invention, the connecting eye is completely formed only in the cured state of the tension-torque-transmission element. It can, for example, be milled or drilled, in any case it can be produced later. This results in a very even and homogeneous margin design of the regular cylindrical hole-face of the connecting eye, from which its later production can be detected without any doubt. As a result of the undisturbed margin design, the connecting section is fully loadable up to the margin of the connecting eye, which leads to optimal use of the cross section and thus to minimum dimensions of the connecting section. Optimal use of the cross section is desirable in particular on the connecting eye on the drive side, because in the fenestron pot several connecting sections need to be arranged one beside the other in a small space, wherein the space requirement of said connecting sections should not have an unfavourable influence on the dimensioning of the fenestron pot.

As is known, the tension-torque-transmission element comprises a bundle of stratified flat fibre layers. Apart from the tensile force from the centrifugal force of the rotating rotor blade, the tension-torque-transmission element has to absorb torsional moments. It therefore to some extent has to be designed so as to be torsionally flexible. This can be achieved by the dimensioning of the cross section. For example, a regular rectangular cross section can be dimensioned according to height and width and according to the ratio of height to width in order to achieve corresponding torsional rigidity. As an alternative to this, other cross sections, for example cruciform cross sections, ellipses, hexagons or octagons or variants of these shapes, if need be with incisions or hollow spaces extending in the direction of centrifugal forces, for influencing torsional rigidity can be selected. Thus the tension-torque-transmission element can also, for example, comprise braces that are flat and arranged one on top of the other, or almost square braces that are arranged one beside the other, with the envelope of these braces resulting in a flat rectangular cross section. In the region of the connecting sections and in order to form the connection sections, the braces are connected to each other in a single piece. A cross section of the tension-torque-transmission element comprising several layered spar tapes that essentially extend in the direction of extension of the tension-torque-transmission element and that are separate from each other has been shown to be particularly advantageous both as far as torsional rigidity and, in particular, as far as its production are concerned. Several layered spar tapes that are interconnected, together form a lamella, with several lamellae forming the tension-torque-transmission element. The adjacent lamellae can be separated by separation layers so that with suitable dimensions of the cross section the tension-torque-transmission element obtains the desired torsional rigidity. The separation layers between adjacent lamellae decouple the lamellae from each other so that, in the case of twisting, transmission of shearing strain between the lamellae is at least reduced. This nonetheless results in a very compact design of the tension-torque-transmission element.

According to a further advantageous embodiment of the invention, the separation layers can be provided in the form of films between the spar tapes. In addition the films can be suitably coated. They prevent the spar tapes from adhering to one another, and they also completely decouple the individual lamellae from each other so that no transmission of shearing strain can take place at their facing boundary surfaces. To this effect, for example, so-called Tedlar® film or materials with comparable characteristics can be used as separation layers. They are coated with Teflon® or a similar material and have been shown to be suitable, in particular adequately resistant and providing good working properties.

According to an alternative embodiment of the invention, slots can be formed between the lamellae, which slots provide an air gap as a separation layer. Thus in this region the facing lateral surfaces of the lamellae no longer contact each other directly; instead they incorporate an air gap between each other. In this way any transmission of shearing strain between individual lamellae is excluded. Moreover, the absence of separate separation film provides an advantage in that production of the tension-torque-transmission element becomes simpler and more economical. It should be kept in mind that the separation layers can be subject to ageing, to becoming brittle and to swelling due to the influence of temperature and humidity. Furthermore, they can wear as a result of fibre layers chafing against each other due to bending loads and torsional loads. In contrast to this, lamellae that are spaced apart are also associated with an advantage in that they can individually be inspected for any damage.

In this arrangement the height of the slots or the distance between lamellae is to be dimensioned in such a way that even in the case of their intended twisting the lamellae do not touch one another. In the dimensioning of the slots between the individual lamellae or in the design of the thickness of the lamellae, the centrifugal force that acts during operation of the rotor wing has a positive effect. This is because the centrifugal force stretches the lamellae, thus resisting any touching of the lamellae.

In order to keep the costs and complexity of producing the torque-transmission element low, the number of lamellae is kept as small as possible. Calculations have shown that with four lamellae of a thickness of approximately 1.13 mm adequate strength and torsional rigidity are provided.

Protection of the torque-transmission element against handling errors during installation is a further criterion in the design of the thickness of the slots and of the lamellae. In other words, the lamella and with them the tension-torque-transmission element are to be dimensioned in such a way that the tension-torque-transmission element cannot manually be over-twisted beyond a permissible torsional angle; this is to prevent a situation in which the component may sustain prior damage already at the time of installation. Calculations of the design of the tension-torque-transmission element indicate a lamella thickness of approximately 1.3 mm, a length of approximately 75 mm, and a favourable width of approximately 12 mm.

The spatial design of the cross section of the tension-torque-transmission element provides a further option for influencing torsional rigidity. According to a further advantageous embodiment of the invention the torque-transmission element comprises a longitudinal slot that extends along its longitudinal axis, which slot penetrates the torque-transmission element perpendicularly to the plane of extension of the spar tapes. The longitudinal slot divides a solid torque-transmission element into two upright braces, one beside the other, which are rectangular in cross section; while the longitudinal slot divides a torque-transmission element comprising several lamellae, stacked one on top of the other, into several pairs of lamellae, one beside the other. The longitudinal slot can be made already during the production of the lamellae, or it can be milled into the torque-transmission element only at a later stage. In the case of almost unchanged strength characteristics of the torque-transmission element, the longitudinal slot considerably reduces its torsional rigidity if required.

According to a further advantageous embodiment of the invention, in the connecting sections of the tension-torque-transmission element on the rotor blade on the one hand, and on the blade connection on the other hand, at the height of the slots additional woven-fabric layers can be arranged. On the one hand they reinforce the connecting sections, which in this way can remove any load introduction, and if applicable load deviation, without sustaining any damage. On the other hand these additional woven-fabric layers produce a space between the lamellae in order to form the separation slots, so that the fibre layers that form the lamellae, when viewed from the side, can extend in a completely planar and straight-line manner through the tension-torque-transmission element. The unidirectional fibre layers of the lamellae are thus optimally loaded, without any deviation in the direction in their plane of extension as a result of the centrifugal force experienced, so that said fibre layers can take over a maximum load with a minimum use of material.

Reliable load transmission from the unidirectional fibre layers to the additional woven-fabric layers takes place by fanning open the unidirectional fibre layers, between which the additional woven-fabric layers are scarf-joined. Since in addition both the unidirectional fibre layers and the additional woven-fabric layers are very thin, a multitude of contact surfaces and bonding surfaces are created between the layers. They ensure damage-free load transmission, because the load can be distributed over a large area so that each individual contact area is not overloaded and thus not in danger of developing cracks. Thus, fanning open and scarf-joining in order to connect the layers ensures damage-tolerant behaviour and an adequate service life of the connection and of the rotor wing overall.

According to a further advantageous embodiment of the invention, the additional woven-fabric layers have a fibre orientation of approximately +/−45° relative to the main direction of extension of the rotor wing or its longitudinal axis. This angular deviation of the fibre orientation, which without incurring any damage can have a tolerance range of +/−10°, causes a load introduction and load distribution into the adjacent lamellae.

According to a further advantageous embodiment of the invention, at the transitions of the separation slots in the connecting sections a continuous transition is formed. Its purpose is, during twisting, in particular in the outer lamellae, to prevent the occurrence of great bending stress that can result from a rigidity step between the end section and the lamellae. In this way the continuous transition provides a continuous increase in the torsional rigidity in the torque-transmission element in order to prevent load peaks in the bending stress, and damage, in particular to the outer lamellae. Thus, the additional woven-fabric layers can be arranged in such a way that in lateral view of the tension-torque-transmission element the lamellae in the transition section continuously increase in thickness until the separation slots are completely filled and the lamellae have quasi grown together to form a uniform block, namely the connecting section. In other words, the additional woven-fabric layers are arranged one on top of the other in a stepped manner starting from the top of a lamella. Furthermore, said layers can also vary in width, for example the first and longest additional woven-fabric layer can be widest, with the following subsequently arranged layers being narrower with increasing height. Their form results in the slots ending obliquely at the connecting sections. In this way an almost stepless transition between the lamellae and the connecting sections can be achieved.

The object mentioned in the introduction is furthermore met by a method for producing a tension-torque-transmission element from a torque-transmission section between two connecting sections, which tension-torque-transmission element is made from a fibre-reinforced material, with the method involving the following steps:

a) placing at least partially ready-made fibre layers, if need be by scarf-joining intermediate layers, in a mould tool to produce a moulded blank;

b) curing the moulded blank under pressure and with heat;

c) at least in some regions milling the cured moulded blank that has been removed from the mould so as to give it its final contour.

The method according to the invention thus takes the unusual approach in that a component in fibre-reinforced composite design is not completely produced with its planned final contour, but instead, at least in some regions, is produced with significant overmeasure, and only in its cured state receives its final dimensions. According to the invention, the tension-torque-transmission element is produced in longer length and wider width when compared to its final dimensions. This is because, due to movements in the fibre layers, displacement during curing can occur in the margin region of the tension-torque-transmission element, which displacement results in a qualitative loss of the laminate in its margin region. Therefore the inside contour of the mould tool for the tension-torque-transmission element can be selected to be wider and longer than its final form. The outside contour of the tension-torque-transmission element is milled only after removing the mould blank from the mould, so as to give it its final shape. As a result of this, in particular, a torque-transmission element of particularly high quality is obtained, because any moulded blank regions that may have been disturbed during production are subsequently milled off. Thus, this production method results in a tension-torque-transmission element that with the smallest possible dimensions provides optimal material use. Furthermore, after the moulded blank has cured, a variation in the width, for example, of the torque-transmission element is still possible in order to in this way, if necessary, change the torsional rigidity of the torque-transmission element. Providing the individual fibre layers ready-made with overmeasure also simplifies their cutting processes, so that preparation costs can be reduced.

Both dry fibres and already resin-pre-impregnated fibre layers, so-called prepregs, are suitable ready-made fibre layers. In order to increase the stability of the moulded blank and thus of the future tension-torque-transmission element, in the connecting sections that are particularly subjected to loads, intermediate layers or filler layers can be scarf-joined. These reinforcement layers can have the same fibre orientation as the fibre layers, or they can have a fibre orientation that differs from this. For example, said reinforcement layers can extend at an angle of +/−45° to +/−90° so as to provide improved strength and rigidity to the connecting sections to be reinforced.

According to an advantageous embodiment of the method according to the invention, in a step d) the connecting eyes in the tension-torque-transmission element are subsequently drilled or milled in a direction perpendicular to the plane of extension of the tension-torque-transmission element. Each connecting eye and the surrounding laminate are dimensioned as a hole-face and are subjected to load. As a result of it having been produced later, the laminate is undisturbed right up to the hole-face. This also reveals the later production of the connecting eye, in that as a result of later drilling the hole-face displays completely undisturbed fibre layers that are placed compactly one above the other. Consequently the tension-torque-transmission element can be produced in the smallest-possible dimensions because there is no need to calculate overmeasure for any fibre layers that have a lower load-bearing capacity and that are disturbed.

BRIEF DESCRIPTION OF THE DRAWINGS

The principle of the invention is explained in more detail in an exemplary manner with reference to the drawing. The following are shown.

MORE DETAILED DESCRIPTION

Figure 1:
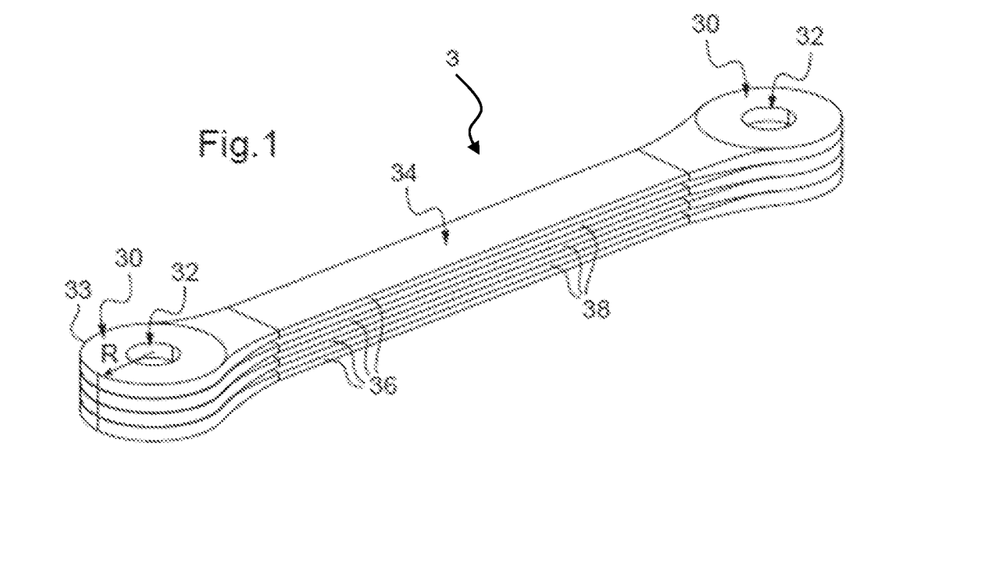
FIG. 1 an illustration of a first tension-torque-transmission element with lamellae.

FIG. 1 shows a tension-torque-transmission element 3 in a fibre-reinforced composite design. It comprises a central elongated rectangular torque-transmission element 34 which on its two narrow sides makes a transition to connecting sections 30. The connecting sections 30, which in horizontal projection are more than semi-circular in shape, comprise circular connecting eyes 32 that have a constant margin space R towards the margin 33 of the respective connecting section 30.

The torque-transmission element 34 comprises four individual tape-shaped lamellae 36 that extend parallel to each other and are stacked, which lamellae enclose slots 38 of the same nature. The lamellae 36 comprise several unidirectional fibre layers which extend right through, whose flow of the fibres is aligned in longitudinal direction of the tension-torque-transmission element 3. The lamellae 36, which are spaced apart from each other by slots 38, in the connecting sections 30 form a homogeneous layer packet that is higher than in the torque-transmission element 34. To this effect, at that location several filler layers are butt-joined between the fibre layers of the lamellae 36, which only extend over the respective connecting section 30. The filler layers comprise multiaxial fibre material whose fibre flow is arranged at an angle of +/−45 degrees or 90 degrees relative to the unidirectional fibre material of the lamellae 36. In this way the connecting sections 30 comprise a multitude of alternately stacked layers of different fibre flow; a design that gives them very good stability.

Figure 2:
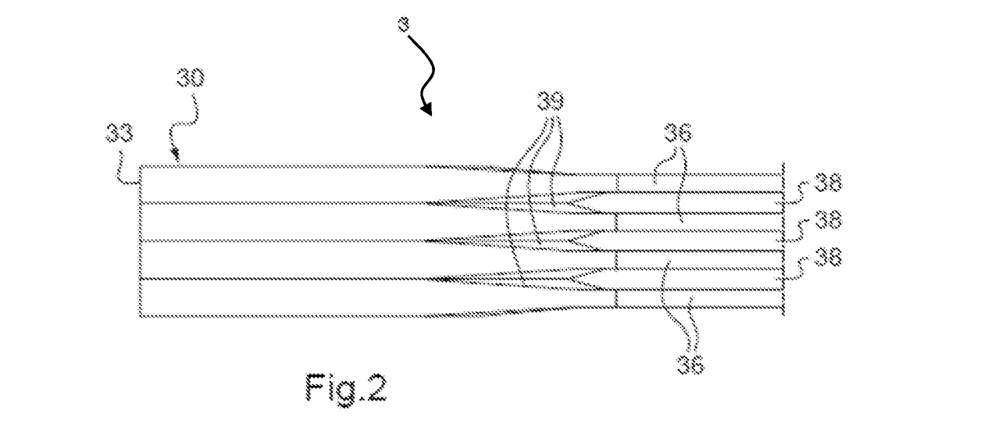
FIG. 2 a detailed view of the tension-torque-transmission element of FIG. 1.

Since the filler layers of the connecting sections 30 do not continue in the torque-transmission element 34, at their positions the slots 38 results. Furthermore, at the transition of the lamellae 36 to the connecting section 30 the filler layers form a transition section 39 which is triangular in top view, and in the lateral view of FIG. 2 is V-shaped. Said transition section 39 prevents a step in rigidity between the torque-transmission element 34 on the one hand, and the compact connecting sections 30 on the other hand. Consequently, bending stress in the outer lamellae 36 is considerably reduced, whose load peaks might otherwise result in damage and in the worst case in failure of the lamellae 36. Instead, scarf-joining the filler layers ensures a continuous increase in torsional rigidity between the torque-transmission element 34 and the connecting sections 30.

Figure 3:
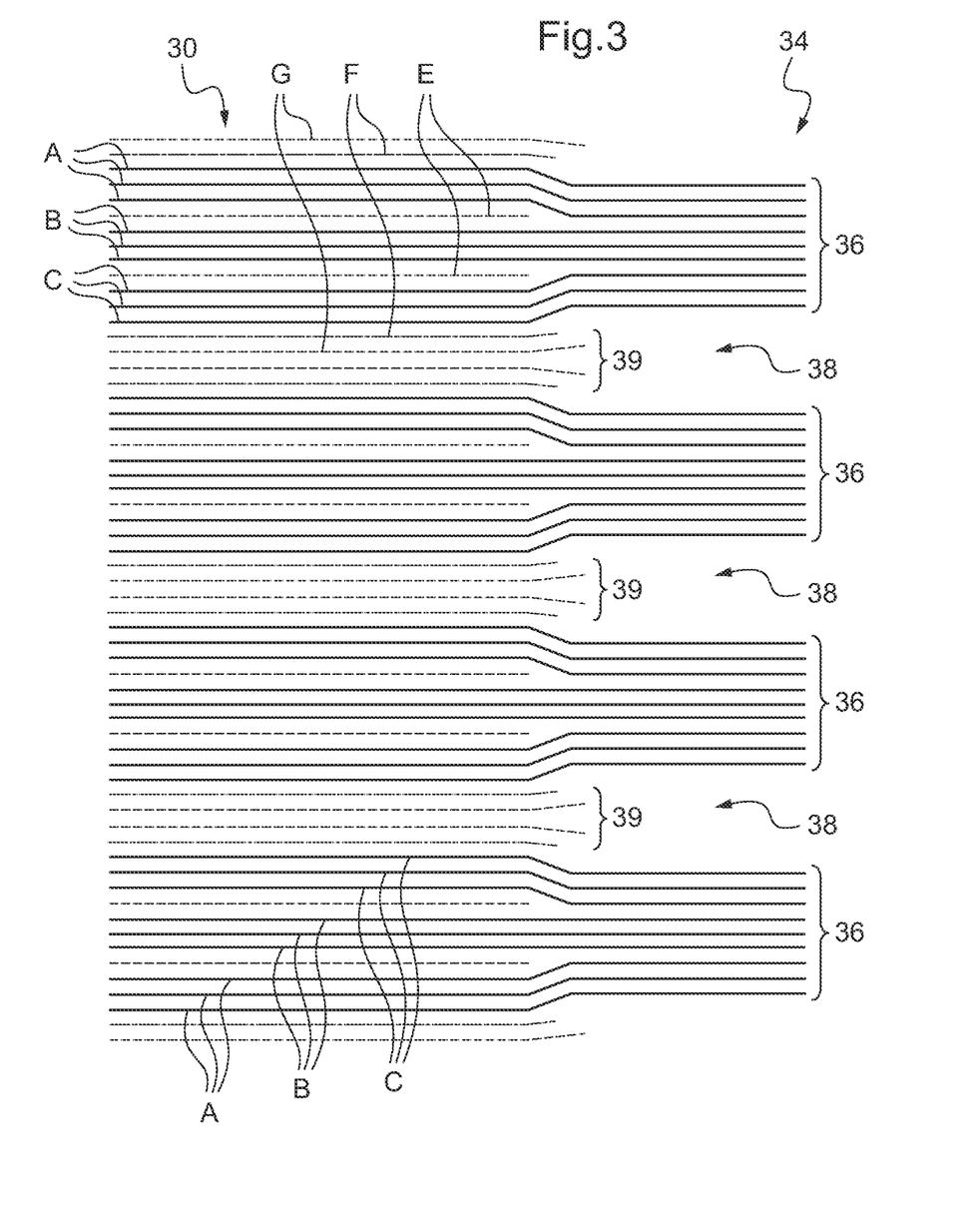
FIG. 3 a view of the individual fibre layers of the detail of FIG. 2.

FIG. 3 shows a detailed design of a connecting section 30 and of an adjoining torque-transmission element 34 comprising four lamellae 36 with three slots 38 arranged in-between according to FIG. 2. The lamellae 36 are formed by three fibre groups A, B, C, which in turn comprise three individual layers. The fibre layers A, B, C represent the continuous unidirectional fibre layers that extend through the entire tension-torque-transmission element 3. Each strand A, B, C is separated from the adjacent strand of the same lamella 36 by a fibre layer E. It comprises a multiaxial fibre material whose individual fibres are aligned so as to be orthogonal in relation to one each other. The fibres of the fibre layers E extend at an angle of +/−45 degrees relative to the unidirectional fibre layers A, B, C.

In the connecting section 30 the fibre bundles A, B, C of each lamella 36 are covered by two fibre layers F that also comprise a unidirectional fibre material. The fibre orientation of the fibre layers F extends at an angle of 90 degrees, in other words at a right angle, relative to the fibre orientation of the layers A, B, C. In each case the fibre layer F is followed by a fibre layer G that comprises the same material as the fibre layer E. It is thus designed so as to be multiaxial, with its fibre orientation also extending +/−45 degrees relative to the unidirectionally extending fibre layers A, B, C.

Furthermore, the fibre layers F, G, which extend between two lamellae 36 and thus in the region of a slot 38, form part of the transition section 39. The shape of the latter is furthermore also defined by the fibre layer E that separates the individual fibre bundles from each other and thus slightly opens up the outer fibre bundles A, C in the region of the connecting section 30.

As far as the detailed layer structure of the tension-torque-transmission element 3 is concerned, we expressly refer to the application with the application number EP 09 400 016.3, whose content relating to the design of a tension-torque-transmission element in a fibre-reinforced composite design and of the corresponding production method is also incorporated to form the subject of the present application. While application EP 09 400 016.3 describes a tension-torque-transmission element that is integrated in a rotor wing, the design comprising individual fibre layers, and the production of the connecting section on the hub side, as well as of the torque-transmission element in a fibre-reinforced composite design, can, however, be applied, in full and without any changes, to the symmetrical tension-torque-transmission element 3 described above.

The connecting eye 32 is thus in the connecting section 30 (compare FIG. 1) designed as a bearing laminate from layers with alternating fibre orientation. It comprises a quasi-isotropic laminate design with an orientation of the fibre layers of +/−45 degrees, 0 degrees and 90 degrees. In this arrangement, there should be approximately the following distribution of the individual fibre layers: the unidirectional fibre layers A, B, C should amount to a share of approximately 45 percent. Fibre layers with an orientation of +/−45 degrees (E, G) should also amount to 45 percent, with the remaining 10 percent being fibre layers F with an orientation of 90 degrees. With this design of the bearing laminate the connection section 30 can, in particular in highly-loaded components, comprise a relatively lower design height when compared to alternative designs. Although the fibre flow is interrupted in the region of the connecting eye 32, a correctly dimensioned bearing laminate only fails at very considerable loads. Possible types of failure include exceeding the compressive strength of the laminate, which results in hole-face failure; tub failure as a result of the tensile strength being exceeded; or pulling-out the connecting eye 32 if the shearing strength is exceeded. This is taken into account by dimensioning the space of the connecting eye 32 from the margin 33 of the connecting section 30. Investigations have shown that the ratio of margin space to diameter of the connecting eye 32 should be in the range of between 1.3 and 2.0. Accordingly, the connecting section 30 comprises a constant radius that is quasi circular around the connecting eye 32.

Figures 4, 5, 6:
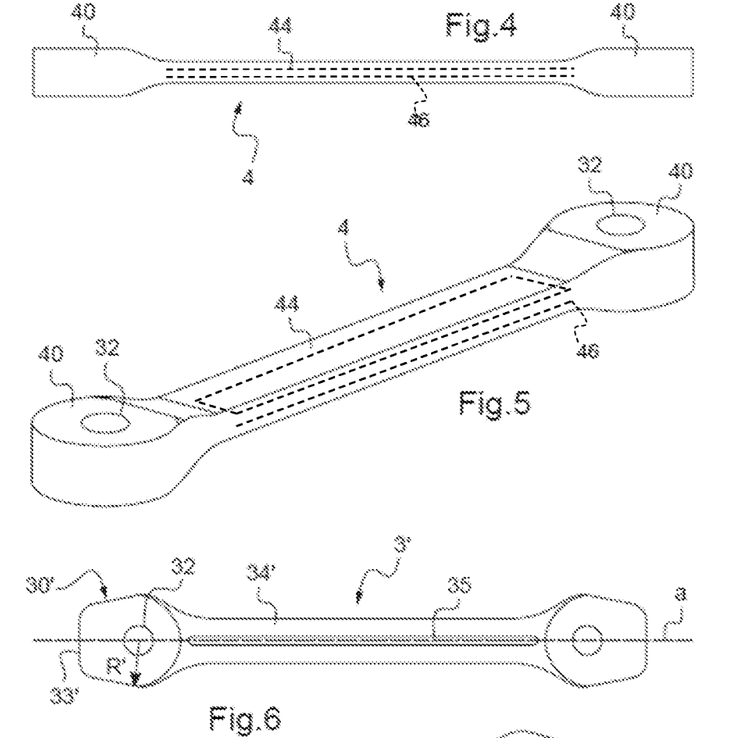
FIGS. 4, 5 two illustrations of a further tension-torque-transmission element.
FIGS. 6, 7 two illustrations of a third tension-torque-transmission element.

FIGS. 4 and 5 show a lateral view and a perspective view of a further tension-torque-transmission element 4 comprising a torque-transmission element 44 and a connecting section 40 on each side. It also comprises fibre-reinforced composite material and spar tapes that extend between the connecting sections 40. The dimensions of said tension-torque-transmission element 4 correspond to those of the tension-torque-transmission element 3 shown in FIG. 1. In a way that is different from this, separation layers 46 made of polyvinyl fluoride film (PVF), such as Tedlar® film, is arranged between the individual lamellae (not shown separately). The film, when subjected to torsional load, prevents any transmission of shearing strain between the lamellae. As a result of stacking the lamellae and the separation layers 46 directly one above the other the torque-transmission element 44 is of a compact design with a closed outer surface without openings between the lamellae. Since there are no spaces between the lamellae, impeding the function of the torque-transmission element 44 as a result of dirt build-up is not possible.

Figure 7:
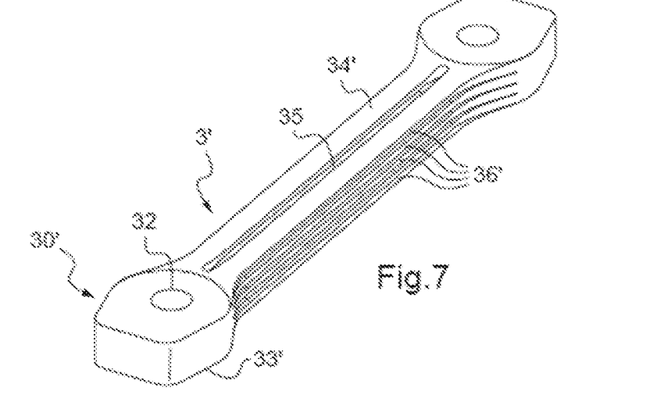

FIGS. 6 and 7 show a further embodiment of a tension-torque-transmission element 3'. When compared to the hitherto-discussed embodiments of FIGS. 1 to 3 or of FIGS. 4 and 5, this further embodiment comprises a modified connecting section 30' and a torque-transmission element 34' of a different design.

The connection section 30' in the conventional manner comprises a connecting eye 32 that is arranged in the centre on a longitudinal axis a of the tension-torque-transmission element 3'. Relative to a margin 33' of the connecting section 30' the connecting eye 32 comprises a margin spacing R'. In a manner different from that of the connecting section 30 according to FIG. 1 or from that of the connecting section 40 according to FIG. 6, the margin space R' to the margin 33' is not constant, so that there is no circular connecting section 30 (FIG. 1) but rather a club-shaped connecting section 30'. It is characterised in that the margin space R' increases considerably in the direction of the longitudinal axis a of the tension-torque-transmission element 3'. At the end of the tension-torque-transmission element 3' the margin 33' extends at a right angle to the longitudinal axis a. In this way the connecting section 30' is provided with particularly good resistance to shearing failure, because the loaded shearing surface between the margin 33' and the connecting eye 32 is significantly greater when compared to that of the connecting section 30 according to FIG. 1. In this way the strength behaviour of the connecting section 30' can be still further improved.

The torque-transmission element 34', like the comparable torque-transmission element 34 according to FIG. 1, in principle comprises four lamellae 36' one stacked on top of the other. In a manner that differs from the embodiments discussed so far, in the longitudinal axis a of the tension-torque-transmission element 3' a vertical longitudinal slot 35 that reaches right through, with a width of 2 mm, is milled right through all the lamellae 36' that are 12 mm wide. This quasi results in eight lamellae, in each case two of which are arranged side-by-side in pairs, and four such lamellae pairs are arranged one on top of another. With almost unchanged strength behaviour, by arranging the longitudinal slot 35 the torsional rigidity of the torque-transmission element 34' can be significantly reduced, namely by more than 50% when compared to the comparable torque-transmission element 34 (compare FIG. 1). This drastically reduced torsional rigidity makes it possible to carry out a pre-flight check without active hydraulics support. After a milling experiment involving the torque-transmission element 34', there was no damage to said torque-transmission element 34' as a result of manual rotation, for example during installation; the torque-transmission element 34' was still sufficiently rigid to prevent the possibility of being manually overwound.

Figure 8:
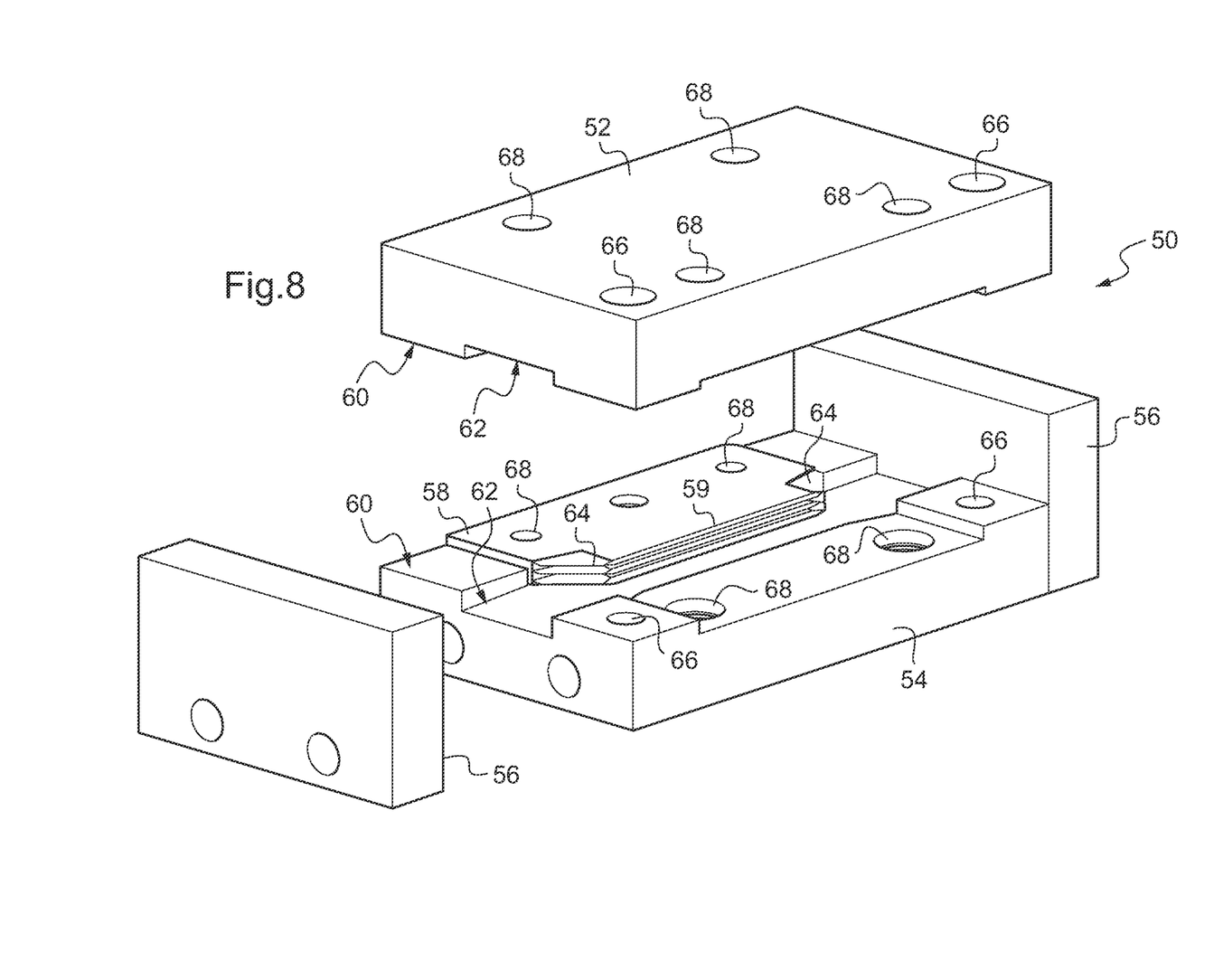
FIG. 8 a mould tool for producing a tension-torque-transmission element.

FIG. 8 shows a two-part production means or mould tool 50 that is rectangular in horizontal projection and that is made of aluminium and which comprises a top 52 and a bottom 54. On its narrow sides end plates 56 adjoin. Furthermore, slotted metal sheets 58 form part of the mould tool 50. They are essentially rectangular, but at their longitudinal side 59 that extends in the mould tool 50 they comprise two bevelled parts 64 instead of corners. In a section perpendicular to the plane of extension of the slotted metal sheets 58 they are triangular and blade-like in shape.

On the facing insides 60 of the top 52 and of the bottom 54, a negative mould 62 has been milled out, which negative mould 62 forms the outer mould for a moulded blank for the tension-torque-transmission element 3. Outside the negative mould 62 the insides 60 of the top and of the bottom 54 comprise corresponding and vertically aligned holes 66 into which pins (not shown) can be inserted as positioning aids. In between there are further holes 68 that interact with the slotted metal sheets 58 according to the same principle.

In order to produce the tension-torque-transmission element 3 the insides 60 of the top 52 and of the bottom 54 comprise a parting agent, and the carbon fibre layers A to G (FIG. 3) are placed sequentially, according to a laying plan, into the mould tool 50. In order to obtain the lamella structure of the torque-transmission element 34 (FIG. 1, FIG. 3) at the location where in the connecting section 30 (FIG. 3) the fibre layers F and G are arranged, the slotted metal sheets 58 are placed between the fibre layers A and C that form the lamellae 21. The dimensions of the slotted metal sheets 58 correspond to the future slots 38 (FIG. 3). The blade-shaped bevelled parts 64 form the negative mould for the transition sections 39 between the individual lamellae 36 and the connecting section 30 (compare FIG. 2).

After all the fibre layers A to G have been put in place, on the ends, end plates 96 are installed on the mould tool 50 so that the mould blank for the future tension-torque-transmission element 3 is enclosed on all sides by the mould tool 50 and during the subsequent curing process will be heated evenly from all sides.

As a result of the change in temperature during the curing process the aluminium mould or the mould tool 50 expands to a greater degree than does the fibre-reinforced material of the tension-torque-transmission element or of its mould blank. During heating up, the mould tool 50 experiences a substantial change in length, in particular in longitudinal direction. Since the coefficient of longitudinal extension of carbon fibre is significantly lower when compared to that of aluminium, the mould tool 50 that expands to a larger extent stretches the fibres of the mould blank. As a result of this, in particular the unidirectional fibre layers are aligned in longitudinal direction of the tension-torque-transmission element and thus in the direction of centrifugal force, and are quasi pre-stressed under tension. The mould blank cures in this state. During subsequent cooling, the mould tool 50 contracts, while the mould blank largely maintains its length. After this the end plates 56 have to be removed because otherwise pressure might be exerted on the mould blank, which pressure could damage it.

In order to obtain an external contour of the tension-torque-transmission element in good quality, for producing the mould blank the fibre layers A to G are not ready-made to their final dimensions but instead are made larger. This is because, due to movements in the fibre layers A to G, displacement during curing can occur in the margin region, which displacement results in a qualitative loss in the margin region of the laminate. Therefore the negative mould 60 of the mould blank is selected to be wider and longer than the final form of the tension-torque-transmission element 3. After the mould blank has been removed from the mould, the final geometric shape of the tension-torque-transmission element is thus produced in that the moulded blank is milled to assume the final external contour. Consequently, a variation in the width, for example of the torque-transmission element 34, is still possible even afterwards, in order to in this way change its rigidity if necessary. Furthermore, this also simplifies the cutting of the individual fibre layers A to G.

After removing the mould blank from the mould and after milling it so that it assumes the final external contour of the tension-torque-transmission element 3, the connecting eyes 32 are drilled into the connecting sections 30 (FIG. 1).

Since the tension-torque-transmission element that has been described in detail above is only one exemplary embodiment, said exemplary embodiment can in the usual way be modified to a large extent by the average person skilled in the art without leaving the scope of the invention. In particular, the specific cutting of the fibre layers and the order of their arrangement can take place in a form that differs from that described in this document. Likewise, the mould tool can be designed in some other form if this is necessary for reasons of space or for design reasons. Furthermore, the use of the indefinite article "a" or "one" does not preclude the possibility of the respective characteristics being present in plural numbers.

LIST OF REFERENCE CHARACTERS 3, 3', 4 Tension-torque-transmission element
30, 30', 40 Connecting section
32 Connecting eye
33 Margin
34, 34', 44 Torque-transmission element
35 Longitudinal slot
36 Lamella
38 Slot
39 Transition section
50 Mould tool
52 Top
54 Bottom
56 End plate
58 Slotted metal sheets
59 Long side
60 Inside
62 Negative mould
64 Bevelled part
66, 68 Hole
A, B, C Unidirectional fibre layers that extend right through
E, F, G Multiaxial fibre layers
R, R' Margin space
a Axis of the tension-torque-transmission element

What is claimed is:

1. A tension-torque-transmission element for a rotor blade of a rotary wing aircraft, wherein a centrifugal force acts on the tension-torque-transmission element in use along a longitudinal direction, the tension-torque transmission element comprising: a connecting section on each of a blade side of the tension-torque-transmission element and a rotary axis side opposite the blade side;
   a connecting eye on each connecting section; and
   a torque-transmission section that connects the connecting sections,
   wherein the tension-torque-transmission element being designed in a fiber-reinforced composite design comprising several layers of a textile fabric, the several layers being interconnected at the connecting sections; the several layers of a textile fabric comprising:
      unidirectional fiber bundles forming separate lamellae of unidirectional fiber material extending longitudinally through the entire tension-torque-transmission element along the longitudinal direction; and additional textile layers at least at the connecting sections and between the unidirectional fiber bundles, the additional textile layers comprising at least a multi-axial fiber layer having a laminate design of multi-axial fibers that extend at angles of +45 degrees and −45 degrees relative to the orientation of the longitudinal direction wherein in the region of the torque-transmission section, the tension-torque-transmission element forms height slots along the longitudinal direction between two unidirectional fiber bundles, each height slot being arranged as an air gap providing free space from one lateral surface of the separate lamellae to the lateral surface of the other separate lamellae.

2. The tension-torque-transmission element according to claim 1, wherein a rectangular cross section of the each of the unidirectional fiber bundles is perpendicular to the longitudinal direction, and wherein each separate lamellae has a width and a height position in the tension-torque-transmission element, the width depending on the height position of the unidirectional fiber bundle in the tension-torque-transmission element to absorb torsional moments.

3. The tension-torque-transmission element according to claim 1, wherein the additional textile layers include at least one unidirectional fiber layer having a design of unidirectional fibers that extend at a right-angle of 90 degrees relative to the longitudinal direction.

4. The tension-torque-transmission element according to claim 1, wherein at the connecting sections, the tension-torque-transmission element includes outer separate lamellae of unidirectional fiber bundles, each outer separate lamellae forms a hole-face connection in the connecting sections that extends essentially without rotating.

5. The tension-torque-transmission element according to claim 4, wherein boreholes in each outer separate lamellae at each connecting section are perpendicular to a plane of extension of the unidirectional fiber bundle and forms the connecting eye for the hole-face connection.

6. The tension-torque-transmission element according to claim 1, further comprising at least one separation layer film being arranged between adjacent separate lamellae as spar tapes in the region of the torque-transmission section, wherein the separation layer film and the adjacent separate lamellae are stacked directly one above the other.

7. The tension-torque-transmission element according to claim 6, wherein the at least one separation layer film comprises a polyvinyl fluoride film as the spar tape.

8. The tension-torque-transmission element according to claim 1, wherein in at least one torque-transmission section includes a width and height position of the separate lamellae, wherein at least one separate lamellae has a hollow space in the form of a longitudinal slot that extends along the longitudinal direction and reaches perpendicularly through the height position.

9. The tension-torque-transmission element according to claim 1, wherein the additional textile layers have two right-angle layers covering each separate lamellae; the two right-angle layers comprising unidirectional fiber material that extend at a right-angle of 90 degrees relative to the longitudinal direction, at the connecting sections.

10. The tension-torque-transmission element according to claim 2, wherein each height slot has a transition section at each end along the longitudinal direction, wherein each transition section obliquely opens up the separation lamellae at the connecting sections.

11. A tension-torque-transmission element for a rotor blade of a rotary wing aircraft that extends in a longitudinal direction, wherein a centrifugal force acts on the tension-torque-transmission element in use along the longitudinal direction, the tension-torque-transmission element comprising:

a pair of connecting sections each having a connection eye, the pair of connecting sections disposed at opposing distal ends of the element;

a torque-transmission section that extends in the longitudinal direction between the pair of connecting sections, the torque-transmission section formed of a plurality of layers, wherein each layer includes:
a unidirectional fiber bundle extending in the longitudinal direction; and
a multi-axial fiber laminate having fibers extending at an angle of +45-degrees and −45-degrees from the longitudinal direction; and at least one separation layer film formed of a polyvinyl fluoride film arranged between at least two of the plurality of layers in the torque-transmission section.

12. The tension-torque-transmission element according to claim 11, wherein a cross-section of the each of the unidirectional fiber bundles perpendicular to the longitudinal direction has a rectangular shape.

13. The tension-torque-transmission element according to claim 12, wherein a width of the rectangular shape of the cross section varies depending on a height position of the unidirectional fiber bundle.

14. The tension-torque-transmission element according to claim 11, wherein each layer includes at least one unidirectional fiber layer having fibers that extend at an angle of 90-degrees from to the longitudinal direction.

15. A tension-torque-transmission element for a rotor blade of a rotary wing aircraft that extends in a longitudinal direction, wherein a centrifugal force acts on the tension-torque-transmission element in use along the longitudinal direction, the tension-torque-transmission element comprising:

a pair of connecting sections each having a connection eye, the pair of connecting sections disposed at opposing distal ends of the element;

a torque-transmission section that extends in the longitudinal direction between the pair of connecting sections, the torque-transmission section formed of a plurality of layers, wherein each layer includes:
a unidirectional fiber bundle extending in the longitudinal direction; and
a multi-axial fiber laminate having fibers extending at an angle of +45-degrees and −45-degrees from the longitudinal direction, wherein the torque-transmission section includes at least one slot along the longitudinal direction formed between two unidirectional fiber bundles, the height slot being arranged as an air gap.

16. The tension-torque-transmission element according to claim 11, wherein the torque-transmission section includes a longitudinal slot that extends along the longitudinal direction and extends perpendicularly through a height of the torque-transmission section.

* * * * *